United States Patent [19]
Kameda et al.

[11] Patent Number: 5,309,789
[45] Date of Patent: May 10, 1994

[54] POWERTRAIN FOR AN AUTOMOTIVE VEHICLE

[75] Inventors: Osamu Kameda, Hiroshima; Hitoshi Akutagawa, Hiroshima; Junichi Okita, Iwakuni; Ichiro Hirose, Hiroshima, all of Japan

[73] Assignee: Mazda Motor Corporation, Hiroshima, Japan

[21] Appl. No.: 857,579

[22] Filed: Mar. 25, 1992

[30] Foreign Application Priority Data

| Mar. 25, 1991 | [JP] | Japan | 3-060516 |
|---|---|---|---|
| Mar. 25, 1991 | [JP] | Japan | 3-060532 |
| Mar. 25, 1991 | [JP] | Japan | 3-060533 |
| Jul. 31, 1991 | [JP] | Japan | 3-192255 |
| Feb. 13, 1992 | [JP] | Japan | 4-026400 |

[51] Int. Cl.$^5$ .............................. F16H 57/02
[52] U.S. Cl. .................. 74/606 R; 74/467; 180/297
[58] Field of Search ............ 74/467, 606 R; 180/297

[56] References Cited

U.S. PATENT DOCUMENTS

| 4,242,923 | 1/1981 | Nishikawa et al. | 74/467 X |
|---|---|---|---|
| 4,899,851 | 2/1990 | Falzoni et al. | 74/467 X |
| 5,088,346 | 2/1992 | Hirabayashi et al. | 74/606 R |

FOREIGN PATENT DOCUMENTS

| 1195515 | 11/1959 | France | 180/297 |
|---|---|---|---|
| 61-153063 | 7/1986 | Japan | 74/467 |
| 1-316561 | 12/1989 | Japan | 180/297 |
| 2-76946 | 3/1990 | Japan | 180/297 |
| 976014 | 11/1964 | United Kingdom | 180/297 |

OTHER PUBLICATIONS

"Chain Drives", Ken Garrett, *Engineering Materials and Design*, vol. 22, No. 2, United Kingdom, Feb. 1978.

*Primary Examiner*—Leslie A. Braun
*Assistant Examiner*—Ryan W. Massay
*Attorney, Agent, or Firm*—Keck, Mahin & Cate

[57] ABSTRACT

An automobile powertrain has at least an engine placed in an engine room and oriented so that its crankshaft is directed transversely, and a transmission placed in the engine room behind the engine. The transmission has input and output shafts arranged coaxially with each other and directed parallel to the crankshaft of the engine. An engine clutch is directly connected to the crankshaft, and a power transfer arrangement is disposed oppositely to the engine with respect to the engine clutch and operationally couples the engine clutch to the input shaft so as to transmit engine output to the transmission. The transmission, engine clutch and power transfer arrangement are independently accommodated in separate chambers of a single unit powertrain case. The transmission chamber and the power transfer chamber are connected to each other by an oil passage through which the input shaft extends from the transmission to the power transfer.

10 Claims, 16 Drawing Sheets

POWERTRAIN FOR AN AUTOMOTIVE VEHICLE

BACKGROUND OF THE INVENTION

1. Field of the Invention

The present invention relates to the construction of a powertrain for an automotive vehicle of a type including at least an engine and a transmission which are transversely mounted and arranged parallel to each other in an engine room of the body of the vehicle.

2. Description of Related Art

In automotive vehicles, such as four-wheel drive vehicles and front engine-front drive (FF) vehicles, the design of a powertrain primarily depends upon whether an engine and a transmission are mounted, as one powertrain unit, transversely or lengthwise in an engine room of the vehicle body. In a transversely mounted powertrain arrangement, if both an engine and a transmission are aligned, i.e., mounted in line, the overall length of the entire powertrain becomes large and the powertrain is not practical. Because of this, some powertrains are formed so that a transmission is positioned behind an engine. A power transfer means, such as a gear train and a chain, is used to operationally couple the engine and the transmission to each other. Such a transversely mounted powertrain is known from, for instance, Japanese patent application No. 63-146,130, entitled "Power Transmitting Apparatus," filed on Jun. 14, 1988 and laid open to the public as Japanese Unexamined Patent Publication No. 1-316,561, on Dec. 21, 1989.

Typically, since an engine clutch, which must be fluid-tightly sealed, is positioned between a transmission and a power transfer arrangement, lubrication oil is introduced through oil passages provided separately in the transmission and the power transfer arrangement for lubricating rotary elements, such as bearings, of the transmission and the power transfer arrangement. Providing such separate lubrication oil passages results in a complicated oil circulating passage system and increases the cost of powertrain.

In order for powertrains to be compactly constructed, some powertrains have a single unitized powertrain case in which at least an engine and a transmission are housed. In what is referred to as a "unitized" powertrain, a single unitized powertrain case is designed so that an interface between two case components includes a center axis of rotation of an output shaft of the transmission. It is, therefore, possible to grasp the output shaft, which is generally great in length, between and by the two case components. Such a unitized powertrain is known from, for instance, Japanese Utility model Publication No. 48-22,886. However, such a unitized powertrain limits possibilities for arranging or locating a transmission in an engine room.

In attempting to arrange a transmission in a desirable manner, it is possible to split a long output shaft of the transmission into two or more shaft portions However, each shaft portion needs more than one bearing and associated parts in order to be supported for rotation with a sufficiently high supporting rigidity. This leads to an increased cost.

SUMMARY OF THE INVENTION

It is an objective of the present invention to provide a unitized powertrain, having a simplified oil passage, in which an engine clutch can be positively sealed in a fluid tight manner.

It is another object of the present invention to provide a unitized powertrain which is manufactured at low cost.

These objects of the present invention are accomplished by providing a unique powertrain structure. The powertrain has at least an engine, placed so that its crankshaft is directed in a transverse direction of the vehicle body, and a transmission, placed behind the engine so that its input and output shafts are arranged coaxially with each other and directed parallel to the crankshaft. Both the engine and the transmission are housed within a single unitized powertrain case. The unitized powertrain case is formed with a plurality of independent chambers in which at least the transmission, an engine clutch and a power transfer arrangement are accommodated separately. The transmission chamber and the power transfer arrangement chamber are connected or communicated with each other by a return oil passage through which the input shaft of the transmission extends to the power transfer arrangement. The return oil passage may be provided either within or outside of the engine clutch chamber.

In a specific embodiment, the unitized powertrain case includes a main case section in which at least the transmission chamber is formed. The main case section is formed with an opening through which elements of the transmission, such as shafts and shift gears, are assembled into the unitized powertrain case. The unitized powertrain case further includes a clutch case section secured to the main case section so as to form the engine clutch chamber therebetween, and a power transfer case section secured to the clutch case section so as to form the power transfer chamber. A support cap, which supports the input shaft for rotation, is secured to the main case section to close the opening during assembly of the powertrain. The support cap is formed with a cylindrical hollow sleeve extending coaxially with the input shaft between the main case section and the clutch case section so as to form the return oil passage through which the input shaft of the transmission extends, thereby communicating the transmission chamber with the power transfer chamber. The clutch case section has a cylindrical hollow sleeve, extending coaxially with the input shaft towards the main case section, which is fluid-tightly connected to the cylindrical hollow sleeve of the support cap so as to form completely the return oil passage. Further, either one of or both the input and output shafts are formed axial oil passages extending therein along their entire lengths through which oil is fed into either the transmission chamber or the power transfer chamber.

According to the powertrain structure of the present invention, an oil pump, which is connected to and driven by the output shaft of the transmission, feeds lubrication oil into the power transfer arrangement chamber through the axial oil passages of the input and output shafts so as to lubricate mobile elements of the power transfer arrangement. When the volume of lubrication oil increases above a predetermined level in the power transfer arrangement chamber, it is automatically returned into the transmission chamber through the return oil passage around the input shaft of the transmission. Thus, lubrication oil is circulated between the transmission chamber and the power transfer arrangement chamber by feeding lubrication oil into the power transfer arrangement chamber only.

Providing the return oil passage so that it extends within the clutch chamber reduces the distance between the rotation axes of the engine and the transmission, so as to allow the powertrain to be made compact.

Because various elements of the transmission, such as bearings and shafts, can previously be sub-assembled to the support cap, it is easy to assemble the transmission into the powertrain case.

BRIEF DESCRIPTION OF THE DRAWINGS

The above and other objects and features of the present invention will be apparent to those skilled in the art from the following description when considered in conjunction with the appended drawings, in which the same reference numerals have been used to designate similar or the same parts or elements throughout the drawings, and in which:

FIG. 13 is a cross-sectional view of the clutch case as seen along line A—A of FIG. 12;

DETAILED DESCRIPTION OF THE PREFERRED EMBODIMENTS

Parts which are not of direct importance to the invention and parts which are purely of conventional construction will not be described in detail. For example, details of an engine, shift gears of a transmission, a differential, etc., all of which are necessarily provided in the automobile powertrain, will not be set out in detail since their construction and operation can easily be arrived at by those skilled in the art.

Figure 1:
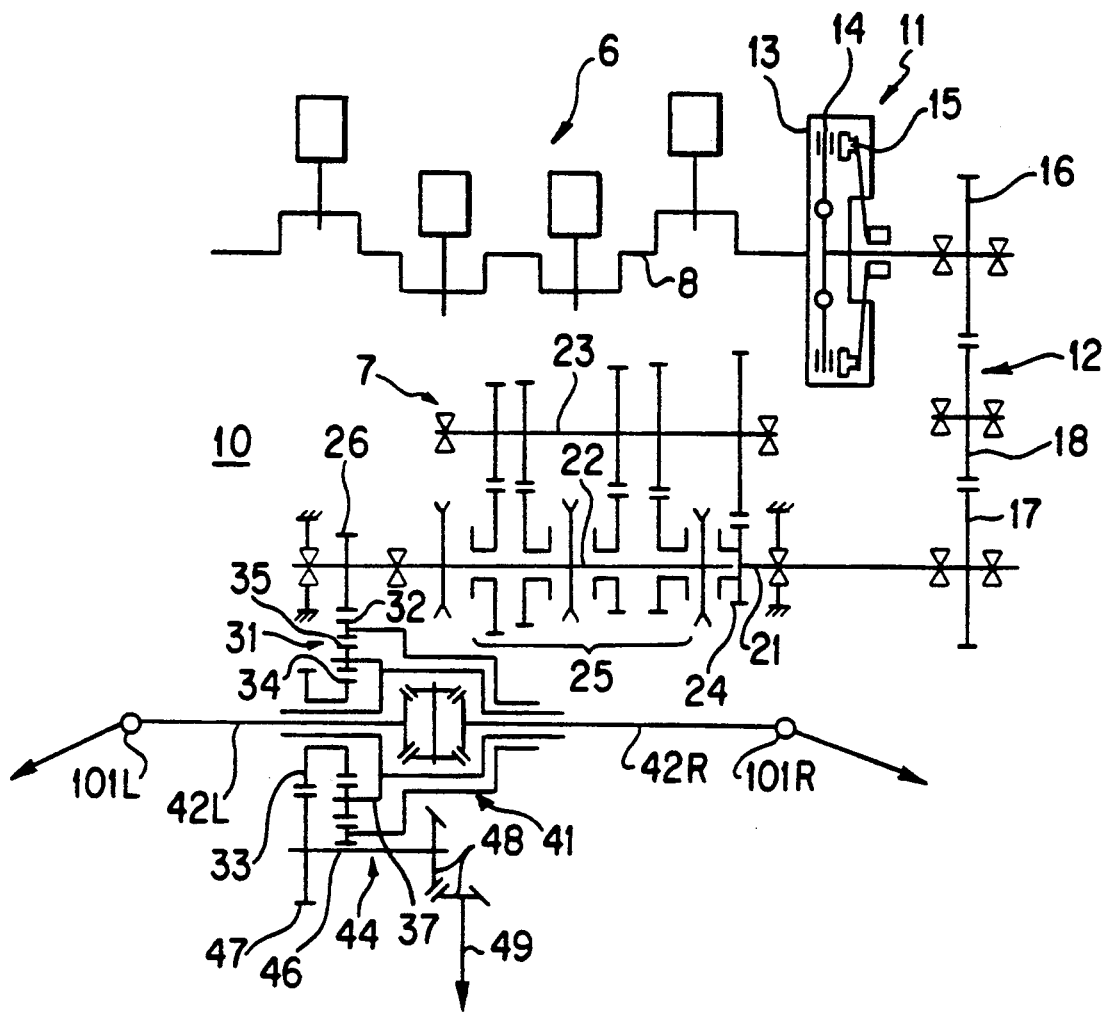
FIG. 1 is a skeleton diagram showing the whole structure of a powertrain of an automotive vehicle in accordance with a preferred embodiment of the present invention.

Referring to the drawings in detail and, in particular, to FIG. 1, a powertrain 10 for a four wheel drive vehicle constructed in accordance with a preferred embodiment of the present invention is shown. In the front part of a vehicle body 1, an engine room or compartment 2 is partitioned from a passenger compartment 4 by a dash panel 3. In the engine room or compartment, there are installed a radiator 5, a transversely placed four-cylinder reciprocating engine 6 and a transversely placed transmission 7. The radiator, engine and transmission are arranged in order and in a lengthwise direction and from front to back of the vehicle body 1. The engine 6, which may, for example, be a four-cylinder reciprocating internal combustion engine, has a crankshaft 8 which is positioned or directed in a transverse direction of the vehicle body. The transmission 7, disposed close behind the transverse engine 6, has input and output shafts 21 and 22 which are coaxially aligned with each other and are positioned or directed parallel to the crankshaft 8. The engine 6 and the transmission are operationally coupled to each other through an engine clutch 11 and a power transfer means, such as a gear train 12. The power transfer gear train 12 is positioned opposite to the engine 6 with respect to the engine clutch 11.

Engine clutch 11 is provided at one end of the crankshaft 8 of the engine 6. The clutch 11 includes a support disk 13 fixedly coupled or fastened to the crankshaft 8, a clutch disk 14 located closely adjacent to the support disk 13, and a pressure disk 15 which forces the clutch disk 14 against the support disk 13. The power transfer gear train 12, which transmits the engine output (i.e., rotation of the crankshaft 8) through the engine clutch 11 to the input shaft 21 of the transmission 7, includes a drive gear 16 fixedly coupled or fastened to the clutch disk 14 of the engine clutch 11, a driven gear 17 fixedly coupled or fastened to the input shaft 21 of transmission 7, and an idle gear 18 connecting the drive and driven gears 16 and 17 so as to transmit the engine output to the transmission 7 through the engine clutch 11. When the engine clutch 11 is engaged, i.e., when the clutch disk 14 is firmly frictionally engaged with the support disk 13, the output from the engine 6 is transmitted to the input shaft 21 of transmission 7 through the power transfer gear train 12, causing the input shaft 21 to rotate.

Transmission 7 has a counter shaft 23, in addition to the input shaft 21 and the output shaft 22 coaxially aligned with each other. The counter shaft is positioned parallel to the axes of rotation of the input and output shafts 21 and 22. The input shaft 21 and the counter shaft 23 are operationally connected by means of a speed reduction gear train 24. A set of shift gears 25 is arranged between the output shaft 22 and the counter shaft 23. The engine output, which is input to the input shaft 21, is transmitted first to the counter shaft 23 through the reduction gear train 24, and then to the output shaft 22 from the counter shaft 23 through one of the shift gears 25 which is manually or automatically selected, so as to accomplish an appropriate speed reduction.

On an extension of the output shaft 22 of the transmission 7, there is fixedly mounted an output gear 26 for transmitting the output from the transmission 7 to a center differential 31. The center differential 31 divides the transmission output into two parts, one of which is transmitted to the front wheels and the other of which is transmitted to the rear wheels. The center differential 31, which can be anyone of several well known planetary gear types, has a ring gear 32 fixedly coupled or fastened to the output shaft 22 of the transmission 7, a sun gear 34 disposed coaxially with the ring gear 32 and fixedly coupled or fastened to a rear wheel output gear 33, a planetary gear 35 meshed with both the ring gear 32 and the sun gear 34, and a carrier 37 fixedly attached to a differential casing 41. One part of the transmission output for the front wheels, which has been divided from the rest of the transmission output by center differential 31, is transmitted to a front differential 41, which is of a type having bevel gears. There, the transmission output, after being further divided into two parts by the front differential 41, is transmitted to the left and right front wheels 9 connected to front axles 42L and 42R by universal joints 91L and 91R, respectively. On the other hand, another part of the transmission output for the rear wheels is transmitted to a rear differential (well known and not shown in the drawings for simplicity) at the back of the vehicle body 1 from the rear wheel output gear 33 through a power transfer means, such as a gear train 44, and a propeller shaft 45 (see FIG. 2). Power transfer gear train 44, which constitutes, or serves as, a power input component of the propeller shaft 45, has a gear drive shaft 46, extending in a transverse direction of the vehicle body 1. Power transfer gear train 44 includes gears, namely, an input gear 47, which is fixedly secured or fastened to one end of the gear drive shaft 46 and meshed with the rear wheel output gear 33, and a pair of hypoid gears 48, which are fixedly secured or fastened to another end of the gear drive shaft 46 and a connecting shaft 49, coupled to the propeller shaft 45, respectively.

Figure 2:
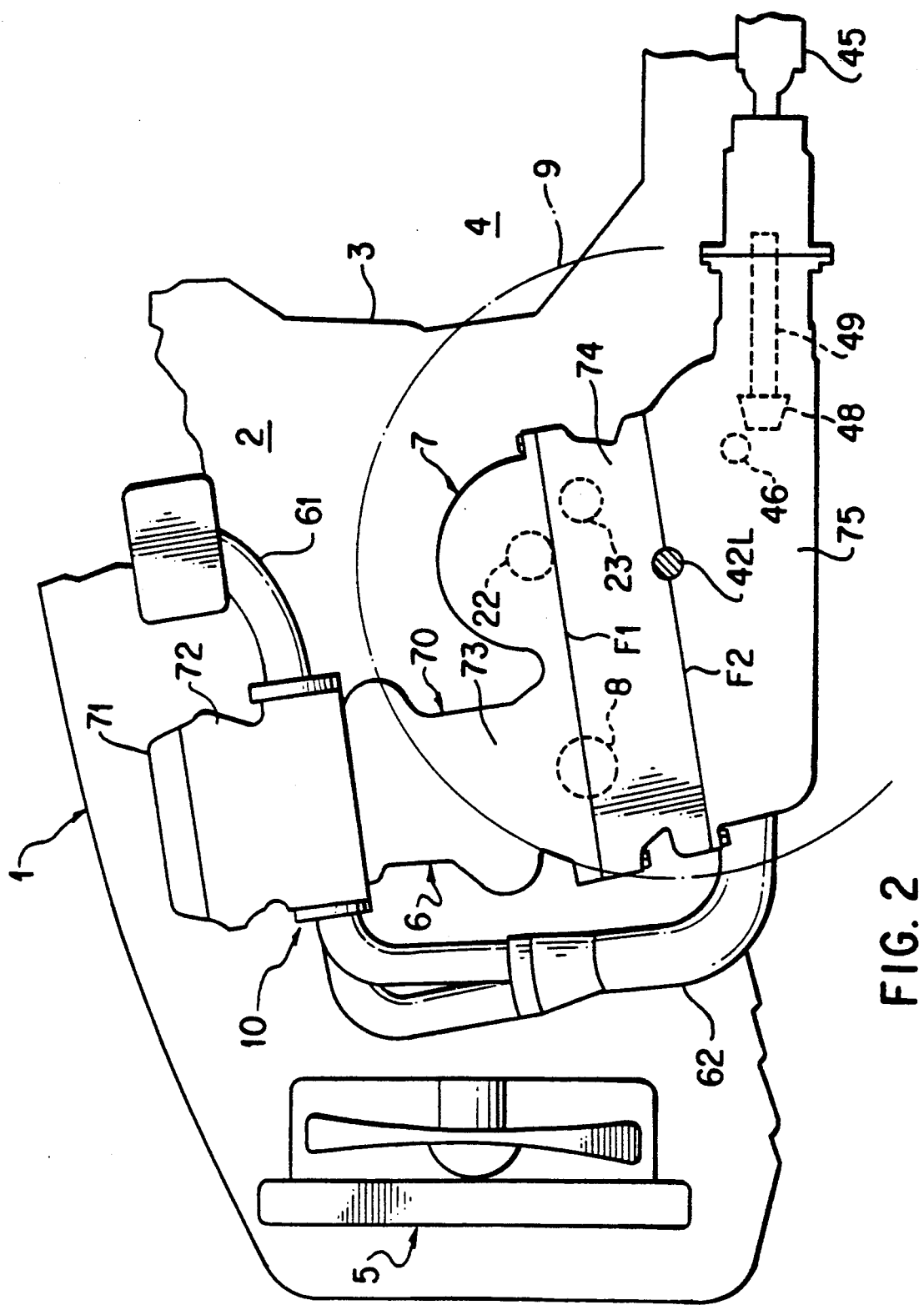
FIG. 2 is an illustration showing an arrangement of the powertrain in an engine room of the vehicle body.

Details of an arrangement of the powertrain, including the engine 6, the transmission 7 and their associated components or parts will be provided with reference to FIG. 2. The engine 6 is placed or mounted transversely in the engine room 2, and has its top portion, i.e., its cylinder head, tilted forward at a slight angle with respect to the vehicle body 1. The powertrain 10 has a unitized case 70, which is made into one unit and includes, from above, a cylinder head cover 71, a cylinder head 72, upper and lower crank cases 73 and 74, and an oil pan 75. The upper and lower crank cases 73 and 74 encase the transmission 7 therein and rotatively support the input and output shafts 21 and 22, and the counter shaft 23, respectively. The oil pan 75 accommodates the power coupling gear train 44 therein. The unitized powertrain case 70 is positioned so that an interface Fl between the upper and lower crank cases 73 and 74, which intersects center axes of cylinders (not shown) formed in the upper crank case 73 at almost 90 degrees, includes therein a center axis of rotation P1 of the crankshaft 8 of the engine 6. Further, an interface F2 between the lower crank case 74 and the oil pan 75 includes therein a center axis of rotation P2 of the front axles 42L and 42R with which the center differential 31 and the front differential 41 are coaxially mounted. In other words, the unitized powertrain case 70 rotatively supports the front axles 42L and 42R between the lower crank case 74 and the oil pan 75. The powertrain 10, constructed from the engine 6, the transmission 7, the center and rear differentials 31 and 41, and the power transfer gear train 44, is encased in the unitized powertrain case 70 as one integral unit.

The engine 6 is provided with an intake manifold 61 attached to its front and an exhaust manifold 62 attached to its back. The intake manifold 61 extends behind the powertrain 10 towards the back of the vehicle body 1.

Figure 3:
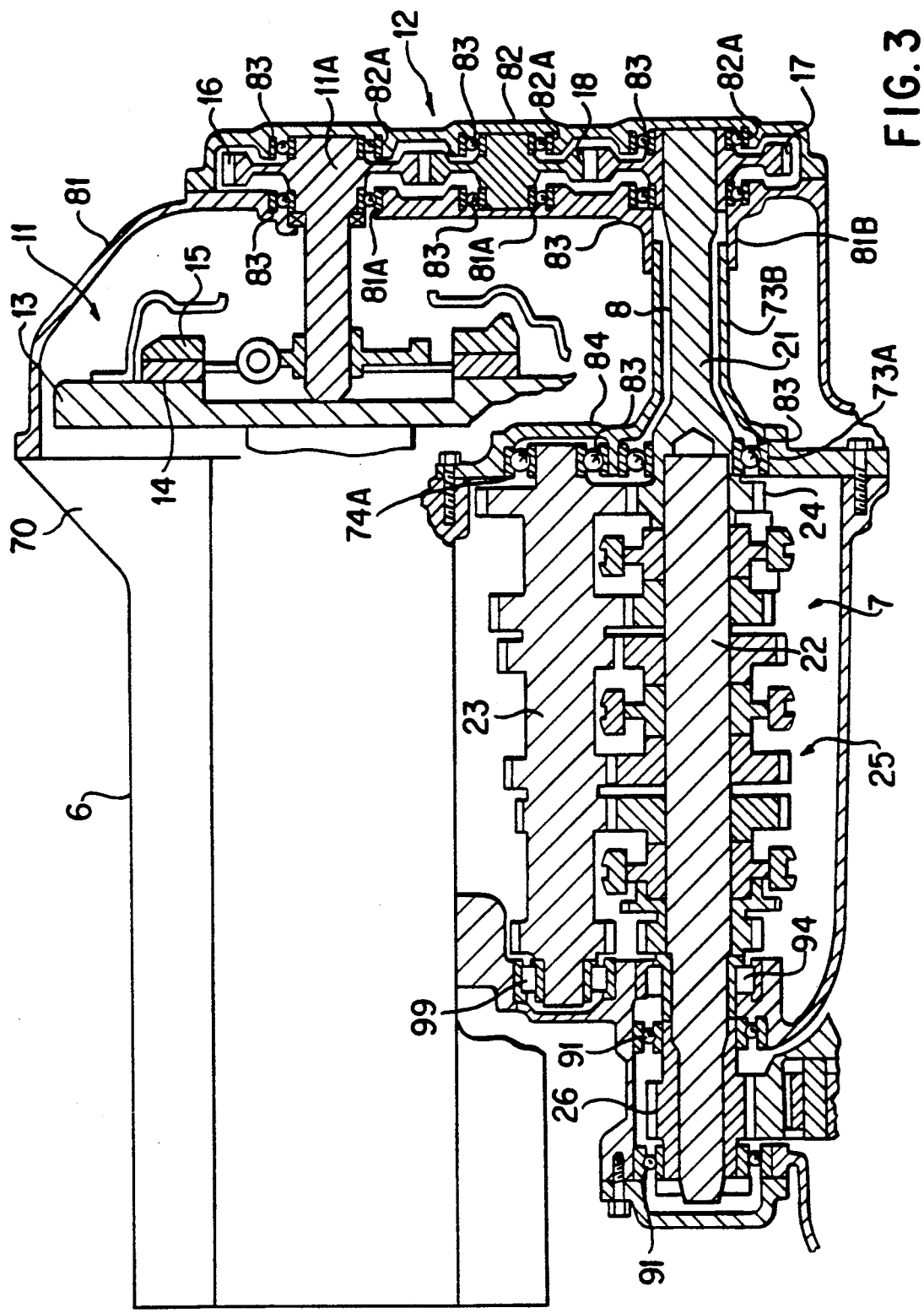
FIG. 3 is a cross-sectional view of an essential part of the of powertrain FIG. 1.
Figure 4:
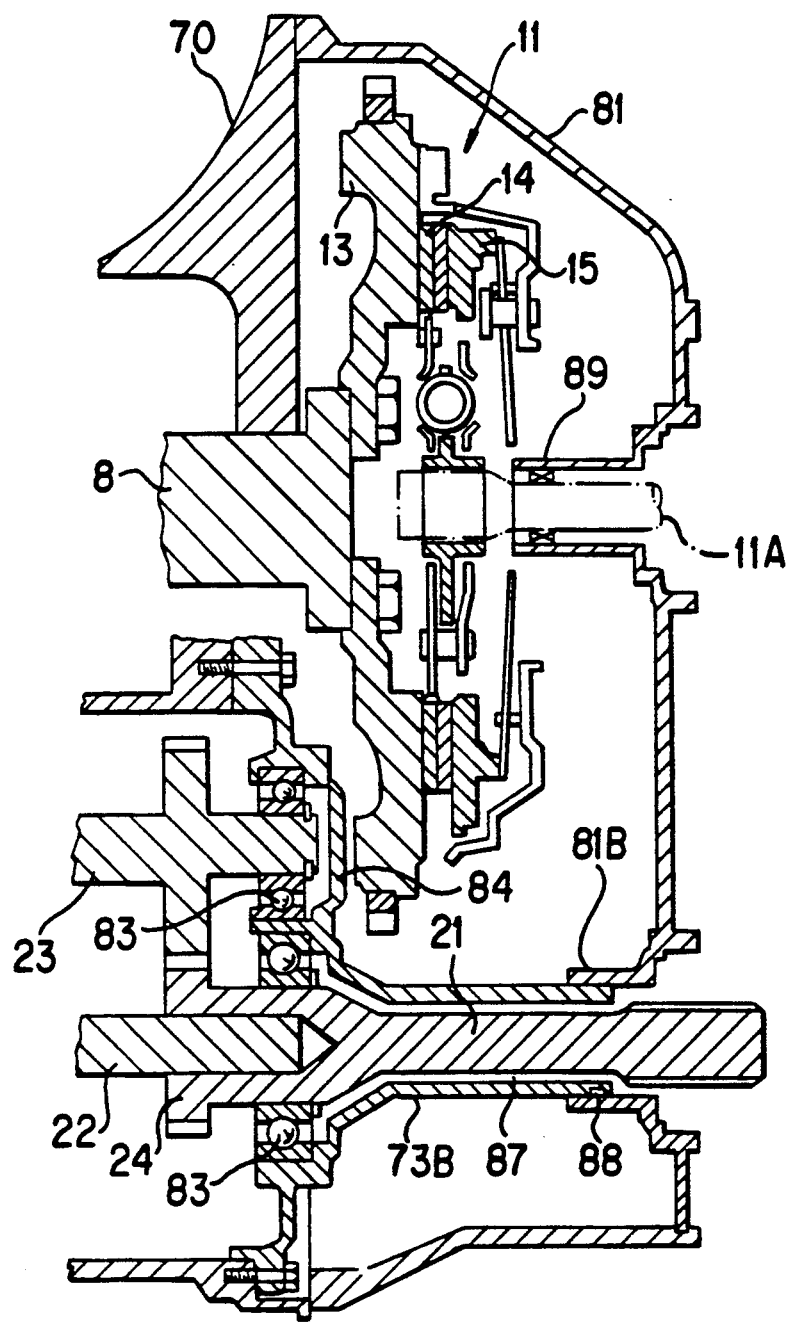
FIG. 4 is a cross-sectional view of an engine clutch of the powertrain of FIG. 1.

Referring to FIGS. 3 and 4, which show details of the engine clutch 11, components of the engine clutch 11 are covered by a clutch case 81 secured to the unitized powertrain case 70. A gear case 82 is secured to the clutch case 81 so as to form a closed oil-tight oil chamber 80 in which the gears 16 to 18 of the power transfer gear train 12 are accommodated. Both the clutch case 81 and the gear case 82 are integrally formed with three inner bearing mounts 81A and three outer bearing mounts 82A, respectively, which hold thrust bearings 83 for rotatively supporting first ends of, from the top, a clutch output shaft 11A, fixedly attached to the drive gear 16, an idle shaft 18A, fixedly attached to the idle gear 18, and the input shaft 21 of the transmission 7 attached to the driven gear 17 by spline coupling. Between the clutch case 81 and the clutch output shaft 11A, there is provided with an oil seal ring 89. An end opening of the upper crank case 73 and the lower crank case 74 on one side adjacent the clutch case 81 is covered by a transmission side cap 84. The transmission side cap 84 is formed with circular bearing mounts 73A and 74A in which thrust bearings 83 are fitted or mounted. The transmission side cap 84 is formed with an integral long sleeve 73B laterally extending toward the clutch case 81 from the circular bearing mount 73A. The transmission side cap 84 is bolted to the unitized powertrain case 70 after assembling the shafts 21-23 of the transmission 7. The thrust bearing 83 mounted in the circular bearing mounts 73A supports the other end of the input shaft 21, and the thrust bearing 83 mounted in the circular bearing mounts 74A supports one end of the counter shaft 23. At the bearing mount 73A, the other end of the input shaft 21 of the transmission 7 is spline-coupled, or otherwise secured, to one end of the output shaft 22 of the transmission 7. The input shaft 21 of the transmission 7 is covered along approximately its whole length by the long sleeve 73B, laterally extending from the transmission side cap 84, and a short sleeve 81B, integrally formed with and laterally extending from the clutch case 81, which are fitted to each other through an oil seal ring 88. As is clearly seen in FIG. 4, there is provided, around the input shaft 21, a small space or oil passage B7 formed by the sleeves 73B and 81B. The small space or oil passage 87 allows oil to flow between inside the transmission 7 and the oil chamber 80 formed between the clutch case 81 and the gear case 82 for the power transfer gear train 12. The provision of the oil passage 87 between the transmission 7 and the oil chamber 80 of the power transfer gear train 12 enables oil to be supplied to either the transmission 7 or the power transfer gear train 12 by an oil pump operated by the engine 6, thereby helping to simplify an oil passage and an oil distribution system, including the oil passage, and decreasing the number of extra parts.

Figure 5:
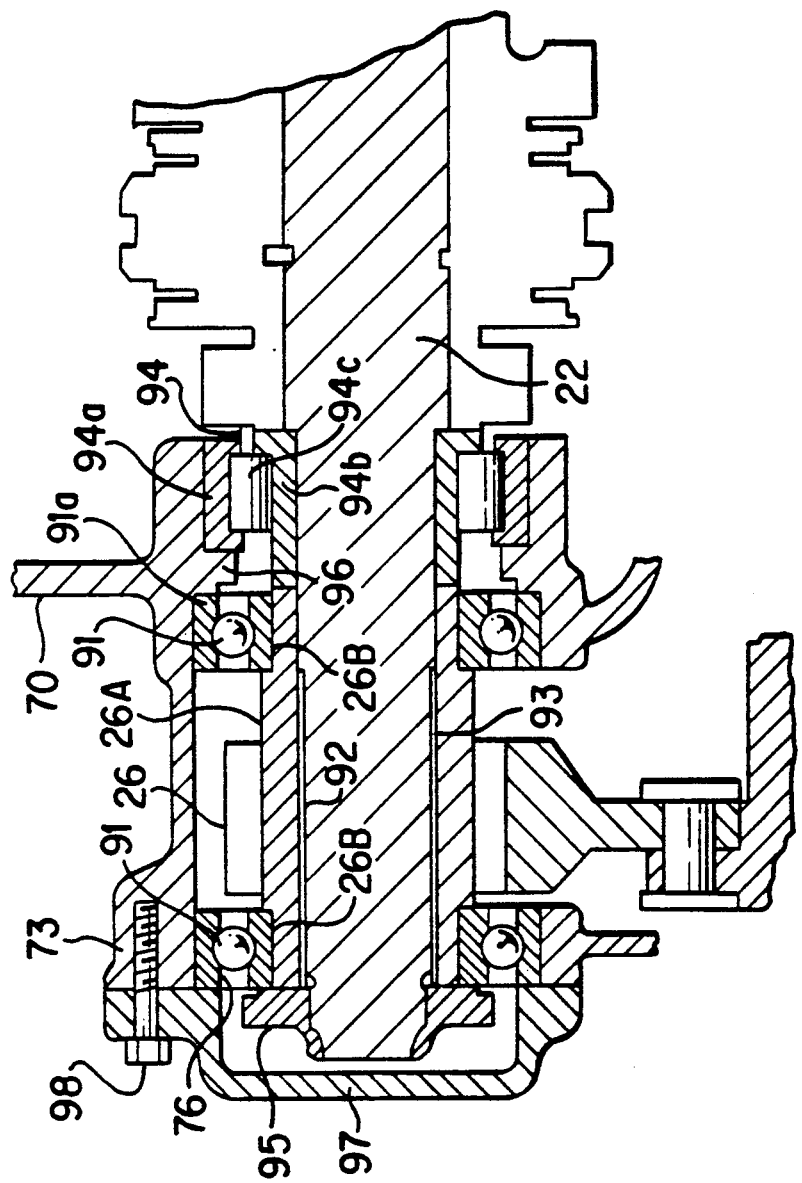
FIG. 5 is a cross-sectional view of a part of an output shaft of a transmission of the powertrain of FIG. 3.

Referring to FIG. 5, showing details of a bearing or supporting structure for another end of the output shaft 22 of the transmission 7, the output gear 26 is shown as integrally formed with an axially extending sleeve-like boss 26A, which is spline-coupled to the other end of the output shaft 22 of the transmission 7. The boss 26A is formed with front and rear shoulders 26B. A pair of thrust bearings 91, on one hand, are fixedly mounted within and by the upper crank case 73 and, on the other hand, are fixedly fitted onto the shoulders 26B of the boss 26A on opposite sides of the output gear 26, so as to support the output shaft 22 at the other end for rotation with respect to the upper crank case 73 of the unitized powertrain case 70. In order to spline-couple the output gear 26, the output gear 26 is formed with a pair of internal spline grooves 92 in the sleeve-like boss 26A which are arranged at diametrically opposite positions and extend axially. The end portion of the output shaft 22 of the transmission 7 is formed with a pair of spline-keys 93, which are arranged at diametrically opposite positions and extend axially so as to be fitted in the spline grooves 92. Further, a radial bearing 94 is provided. The radial bearing 94 is mounted so that it is fixed within and by the upper crank case 73 for supporting the output shaft 22 for rotation with respect to the upper crank case 73. The radial bearing 94 has an outer bearing ring 94a fixedly mounted within the upper crank case 73 and an inner bearing ring 91b fixedly mounted on the output shaft 22. Between an outer bearing ring 91a of the thrust bearing 91 and the outer bearing ring 94a of the radial bearing 94, the upper crank case 73 is integrally formed with a radially extending collar or ring 96. The outer end of the output shaft 22 of the transmission 7, extending outside of the upper crank case 73 through an opening 76, has a fastening nut 95 attached to it so as to fasten the output gear 26 to the output shaft 22. A cap or cover 97 is secured by bolts 98 to the upper crank case 73 so as to cover the opening 76 of the upper crank case 73 as well as the outer end of the output shaft 22 of the transmission 7.

Figure 6:
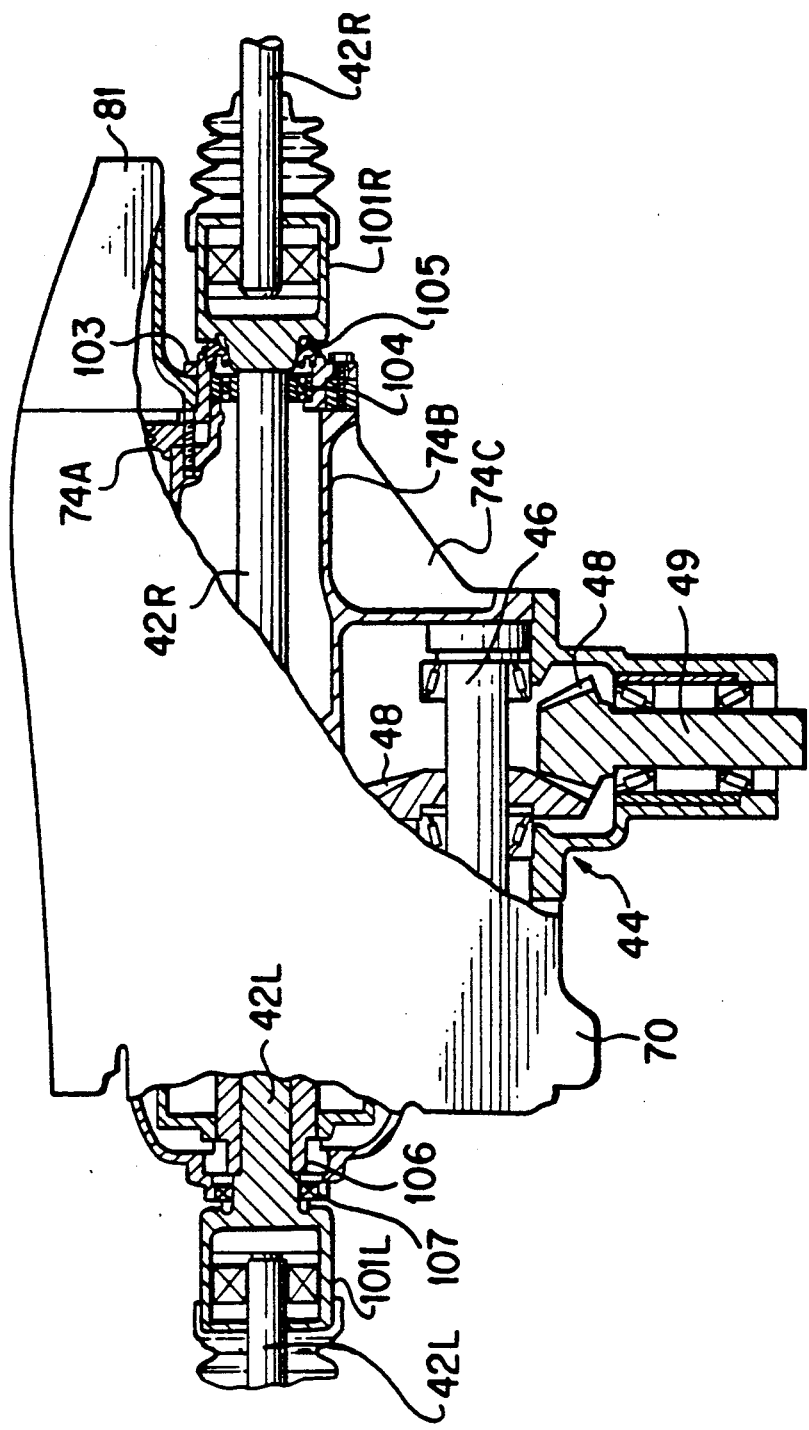
FIG. 6 is a cross-sectional view of a part of a front differential of the powertrain of FIG. 1.
Figure 7:
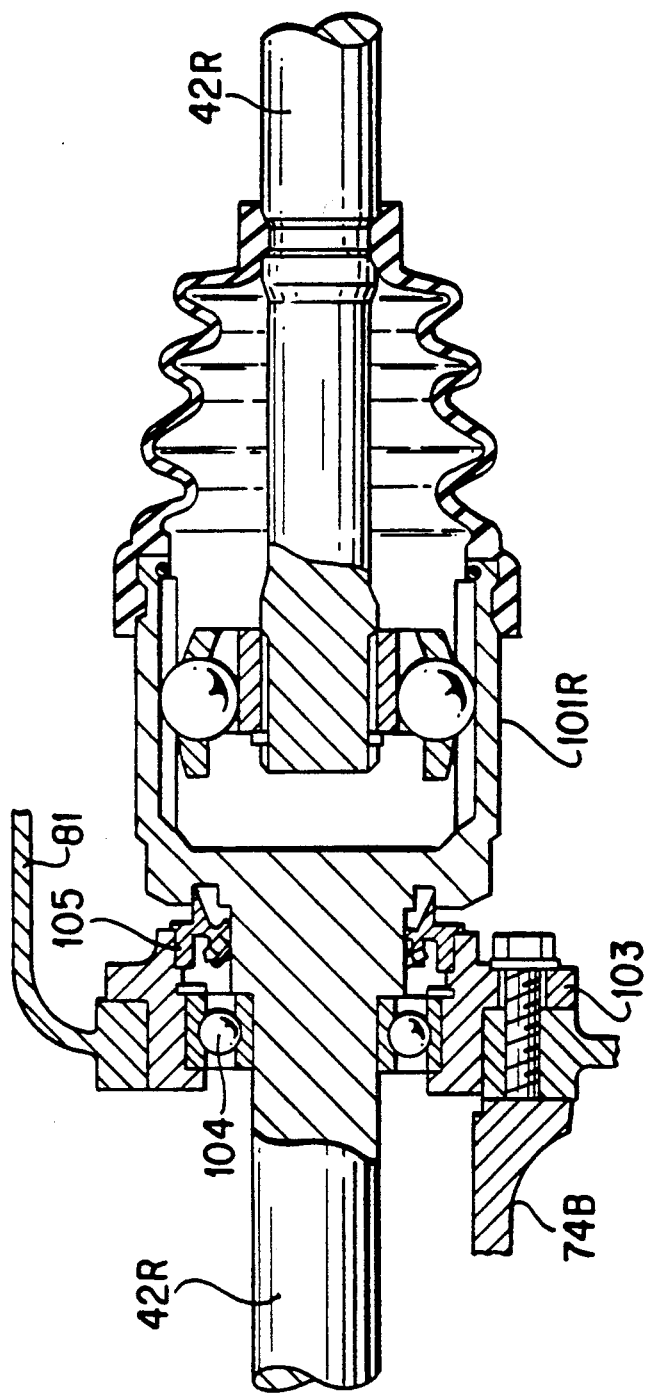
FIG. 7 is a detailed cross sectional view of a joint of a front axle.
Figure 8:
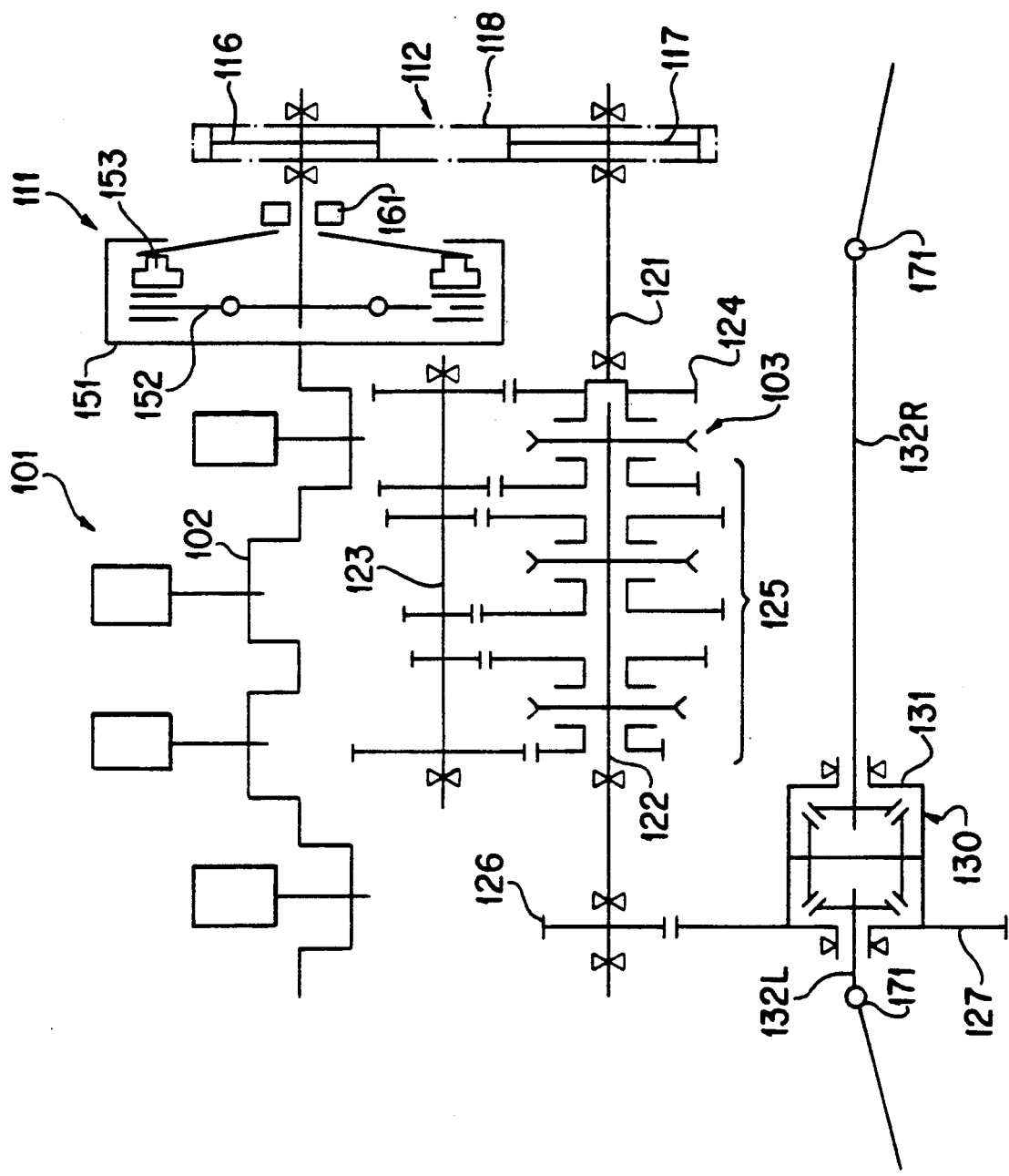
FIG. 8 is a skeleton diagram showing the entire structure of a powertrain of an automotive vehicle in accordance with another preferred embodiment of the present invention.

Referring to FIGS. 6 and 7 in conjunction with FIG. 1, showing details of the front axles 42L and 42R which operationally connect the front differential 41 with the front wheels 9, there are left and right universal joints 101L and 101R for the left and right front wheels 9. The right universal joint 101R is located close to one end of the transmission 7 in the axial direction opposite to another end at which the front differential 41 is closely located. The front axles 42L and 42R have almost the same length from the respective universal joints 101L and 101R to the respective front wheels 9. For enclosing the center differential 41, the lower crank case 74 of the unitized powertrain case 70 is integrally formed with a case extension 74B extending laterally to the right universal joint 101R so as to enclose the right axle 42R, which is supported for rotation by the thrust bearings 104 mounted in the case extension 74B. Bolted or otherwise secured to case extension 74B of the unitized powertrain case 70 is an axle cover 103 for surrounding and covering the right front axle 42R and securing a lower portion of the clutch cover 81 to the case extension 74B. Within the axle cover 103, there are provided a thrust bearing 104 for supporting the right front axle 42R and a seal ring 105 for preventing foreign articles from entering into and oil from leaking from the inside of the case extension 74B. The left front axle 42L is supported by a thrust bearing 106 mounted within the lower crank case 74 of the unitized powertrain case 70. A seal ring 107 is also provided so as to prevent foreign articles from entering into and oil from leaking out from the inside of the case extension 74B.

Gear drive shaft 46 of the power transfer gear train 44 extends from the front differential 41 to the case extension 74B. The unitized powertrain case 70 is reinforced by a rib 74C, integrally formed therewith between that case portion in which the power transfer gear train 44 is encased and the case extension 74B.

In assembling the output shaft 22 and the counter shaft 23 of the transmission 7 into the unitized case 70 of the powertrain 10, the output gear 26, with the pair of inner and outer bearings 91 mounted thereon, is inserted into the unitized case 70 through the opening 76 until the outer bearing ring 91a of the inner thrust bering 91 abuts against the radially extending collar 96. Further, only the outer bearing ring 94a with bearing rollers 94c of the radial bearing 94 is inserted into the unitized case 70 from an opposite side of the unitized case 70 at which the clutch case 81 is to be attached until the outer bearing ring 94a of the radial bearing 94 abuts against the radially extending collar 96. Before assembling the shafts 21, 22 and 23 of the transmission 7 into the unitized case 70, the inner bearing ring 94b of the thrust bearing 94 is fitted onto the output shaft 22; the input shaft 21 and the counter shaft 23 are fitted into the thrust bearings 83. Then, after coupling the output shaft 22 and the input shaft 21 end to end so as to assemble all the shafts 21-23 of the transmission 7 to the transmission side cap 84 as one unit, the output shaft 22 and the counter shaft 23 are inserted into the unitized case 70 so as to be fitted at their ends in the sleeve-like boss 26A of the output gear 26 and the thrust bearing 99, respectively. In particular, the output shaft 22 is spline coupled to the sleeve-like boss 26A of the output gear 26. Upon spline-coupling the output shaft 22 to the sleeve-like boss 26A of the output gear 26, the inner bearing ring 94b, previously mounted on the output shaft 22, is fitted in the outer bearing ring 94 so as to rotatably hold the bearing rollers 94c therebetween, thereby completing the radial bearing 94. After assembly of radial bearing 94 is completed, the inner bearing ring 94b abuts in an axial direction against the inner end of the sleeve-like boss 26A of the output gear 26. Simultaneously, the output shaft 22 receives a reaction force from the radially extending collar 96 of the unitized case 70 through the outer bearing ring 94a. Consequently, the output shaft 22 is restricted in axial position, so as to be installed easily and accurately in the unitized case 70. The output shaft 22 is also prevented from acting against the sleeve-like boss 26A of the output gear 26 with an excessive axial force. Thereafter, the fastening nut 95 is attached so as to fasten the output gear 26 to the output shaft 22. Finally, the transmission side caps 84 and 97 are bolted to the upper crank case 73.

After assembling the transmission 7, the clutch case 81 is bolted or otherwise secured to the unitized case 70 so as to fit the long sleeve 73B of the transmission side cap 84 and the short sleeve 81B of the clutch case 81 to each other in a liquid-tight fashion. Further, the gear case 82 is bolted or otherwise secured to the clutch case 81.

The powertrain 10 described above, in which a unitized case 70 is utilized commonly for the engine 6 and the transmission 7, enables lubrication oil to be supplied directly to the transmission 7 from the oil pan 75. This leads to a simplified lubrication system for the powertrain 10. For instance, both the transmission 7 and the power transfer gear train 12 can be lubricated by a common oil pump (not shown) driven by the engine 6. The oil passage 87 is formed around the input shaft 21 of the transmission 7 between the transmission side cap 84 and the clutch cover 81 by the sleeves 73B and 81B integral with the transmission side cap 84 and the clutch cover 81, respectively. When the clutch cover 81 is secured to the transmission side cap 84, the distance between the axes of rotation of the engine 6 and the transmission 7 is made shorter than providing it outside the clutch case 81. This enables the powertrain 10 to be made compact. The powertrain 10 enables the input and counter shafts 21 and 23 of the transmission 7, which are previously subassembled to the transmission side cap 84 as one unit, to be inserted together into the unitized case 70. Assembly of the transmission 7 to the powertrain 10 is, therefore, simplified. Output gear 26 and the output shaft 22 of the transmission 7, which are separately provided from each other, can be installed separately into the unitized case 70 and coupled to each other as the output shaft 22 is inserted into and assembled to the unitized case 70. This is also advantageous for simplifying assembly of the transmission 7 to the powertrain 10. The disposition of the thrust bearings 91 on the opposite sides of the output gear 26 enables the output shaft to be held by the unitized case 70 with high structural rigidity. This also enables omission of the radial bearing 94 or use of a radial bearing which has a reduced size.

Referring to FIGS. 8 to 11, a powertrain 100 for a front engine, front drive vehicle constructed in accordance with another preferred embodiment of the present invention is shown.

An engine 101, such as a four-cylinder, reciprocating internal combustion engine, is disposed in an engine room or compartment of a vehicle body (not shown) with its crankshaft 102 directed so that it extends in a transverse direction of the vehicle body. A transmission 103, arranged close to and behind the transverse engine 101, has input and output shafts 121 and 122 which are coaxially aligned with each other and are positioned or directed parallel to the crankshaft 102. The engine 101 and the transmission 103 are operationally coupled to each other through an engine clutch 111 and a power transfer means, such as a sprocket-chain power transfer arrangement 112.

Engine clutch 111 is fastened or connected to one end of the crankshaft 102 of the engine 101. The clutch 111 includes a support disk 151 fixedly coupled or fastened to the crankshaft 102, a clutch disk 152 closely adjacent the support disk 151, and a pressure disk 153. The pressure disk 153 is urged by a disk spring 154 so as to force the clutch disk 152 against the support disk 151, thereby connecting the engine clutch 111. The engine clutch 111 can be released or disconnected by a release fork 155.

Sprocket-chain power transfer arrangement 112, which transmits the engine output through the engine clutch 111 to the input shaft 121 of the transmission 103, includes a drive sprocket 116 fixedly coupled or fastened to a clutch disk 152 of the engine clutch 111, a driven sprocket 117 fixedly coupled or fastened to the input shaft 121 of the transmission 103, and a chain 118 connecting the drive and driven sprockets 116 and 117 so as to transmit the engine output to the transmission 103 through the engine clutch 111. When the engine clutch 11 is engaged, i.e., when the clutch disk 152 is firmly frictionally engaged with a support disk 151, the engine output of the engine 101 is connected to the input shaft 121 of transmission 103 through the sprocket-chain power transfer 112, causing the input shaft 121 to rotate.

Transmission 103 has a counter shaft 123 in addition to the input shaft 121 and the output shaft 122 coaxially aligned with each other. The counter shaft 123 is positioned parallel to the axes of rotation of the input and output shafts 121 and 122. The input shaft 121 and the counter shaft 123 are operationally connected by means of a speed reduction gear train 124. A set of shift gears 125 is arranged between the output shaft 122 and the counter shaft 123. The engine output which is input to the input shaft 121 is transmitted first to the counter shaft 123 through the reduction gear train 124 and then to the output shaft 122 from the counter shaft 123 through one of the shift gears 125, which is manually or automatically selected, so as to accomplish an appropriate speed reduction.

On an extension of the output shaft 122 of the transmission 103, there is fixedly mounted an output gear 126 for transmitting the output from the transmission 103 to an input gear 127 secured to a differential case 131 of a front axle differential 130. The front axle differential 130, which may be any one of several well known bevel gear type differentials, divides the transmission output into two parts, one being for the right front axle 132R and the other being for the left front axle 132L. Each front axle 132R or 132L is connected to a front wheel (not shown) through a universal joint 171. The right and left front axles 132R and 132L, although having different entire lengths from the front differential 130, are designed to be almost equal to each other in length between the universal joint 171 and the wheel.

Figure 11:
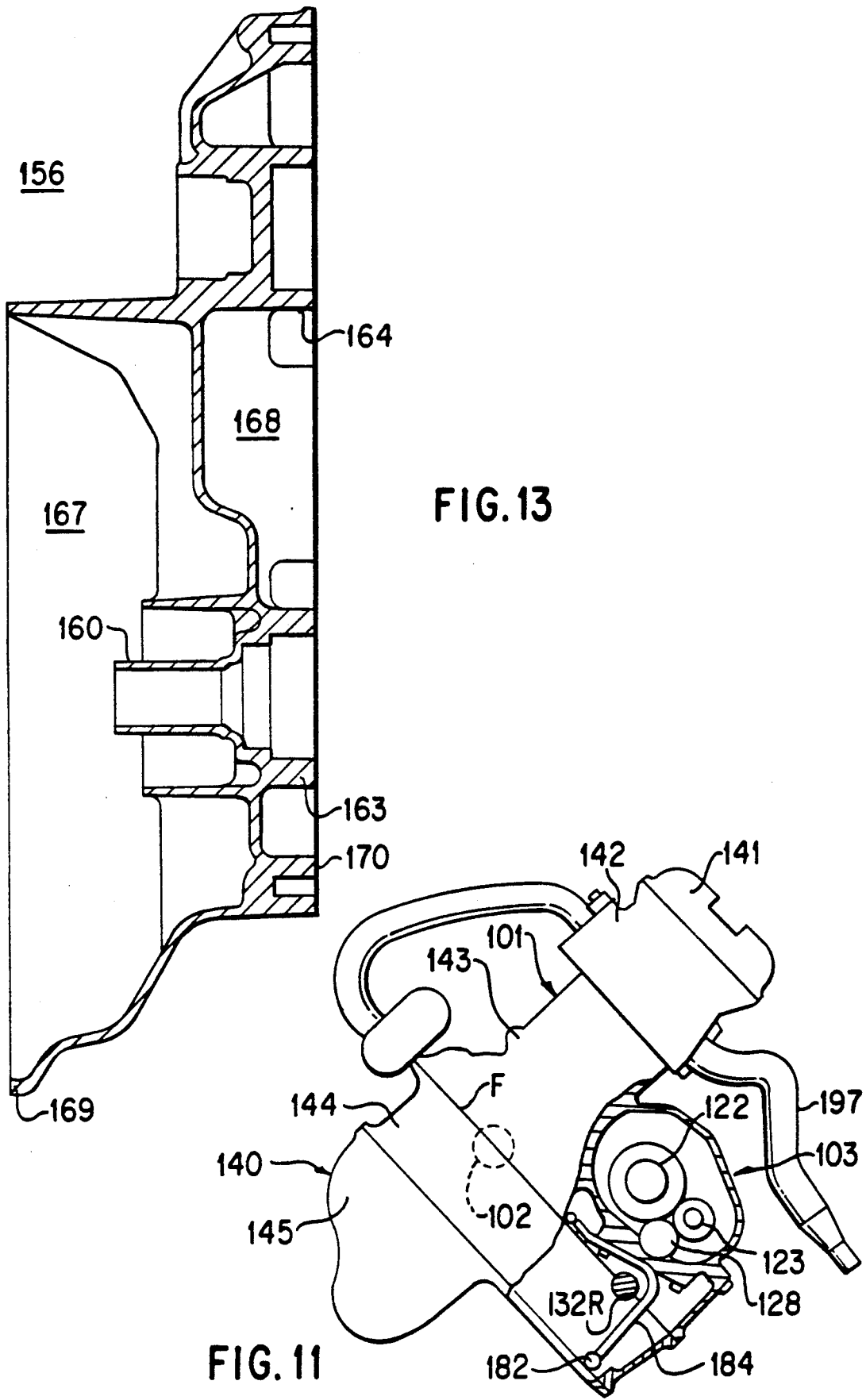
FIG. 11 is an illustration, partly in section, showing an arrangement of the powertrain of FIG. 8.

As is shown in detail in FIG. 11, the engine 101 is placed or mounted transversely in the engine room and has cylinders with vertical axes which are inclined backwards at an appropriate angle with respect to the vehicle body. The powertrain 100 has a unitized case 140 which is constructed as one unit, from the above, by a cylinder head cover 141, a cylinder head 142, upper and lower crank cases 143 and 144, and an oil pan 145. The upper and lower crank cases 143 and 144 are connected so as to place their interface F so that it includes therein the center axis of rotation of the crankshaft 102 and intersects perpendicularly the vertical axes of the cylinders. The transmission 103 is encased within the upper crank case 143 of the unitized case 140 so that the input and output shafts 121 and 122 are positioned in front of the counter shaft 123 with respect to the vehicle body. An idle reverse gear 128 is disposed between and below the output shafts 121 and 122 and the counter shaft 123. The front differential 130 is encased within both the upper and lower crank cases 143 and 144 of the unitized case 140 so that the right and left front axles 132R and 132L are positioned in or aligned with the interface F and below the transmission 103. The unitized case 140, encases all the engine 101, the transmission 103 and the front differential 130 therein, and is divided into three independent chambers, namely, an engine chamber 140E, a transmission chamber 140T and a differential chamber 140D, each chamber being formed and partitioned so as to keep a necessary standard oil level. The differential chamber 140D is laterally extended nearly to the universal joint 171 so as to surround the right front axle 132R.

Referring back to FIG. 9, the engine clutch 111 is covered by a clutch case 156. The clutch case 156 is separate from the unitized case 140 of the powertrain 100 and secured to the unitized case 140. Similarly, the sprocket-chain power transfer arrangement 112 is covered by a sprocket-chain case 157. The sprocket-chain case is separate from the unitized case 140 of the powertrain 10 and secured to the clutch case 156.

Clutch case 156 is formed with bearing mounting cylindrical bosses 163 and 164 extending laterally outside thereof. The bosses mount bearings 158 for rotatively supporting the drive and driven sprockets 116 and 117, respectively. The drive sprocket 116 is held between thrust rings 165 and 166 and forced by an annular rib 157a integrally formed on the inside surface of the sprocket-chain case 157 in an axial direction of rotation thereof. The drive sprocket 116 is fastened to the clutch disk 152 of the engine clutch 111 by means of a shaft 159 formed integrally with, or otherwise secured to, the drive sprocket 116. Similarly, the driven sprocket 117 is held between thrust rings 165 and 166 and forced by an annular rib 157b, integrally formed on the inside surface of the sprocket chain case 157, in an axial direction of rotation thereof. On the other hand, the driven sprocket 117 is spline-coupled to the input shaft 121 of the transmission 103.

Clutch case 156 is further formed with a cylindrical sleeve 160, extending laterally inside from the bearing mounting cylindrical boss 163, which covers the shaft 159. On the cylindrical sleeve 160, the disk spring 154 is mounted by a release bearing 161 so as to slide in the axial direction of rotation of the drive sprocket 116. The release fork 155, supported on a pivot 162 secured to the clutch case 156 so as to form a lever, has one end connected to the release bearing 161 and another end extending outside the clutch case 156 and connected with a clutch actuating device (not shown).

Figure 12:
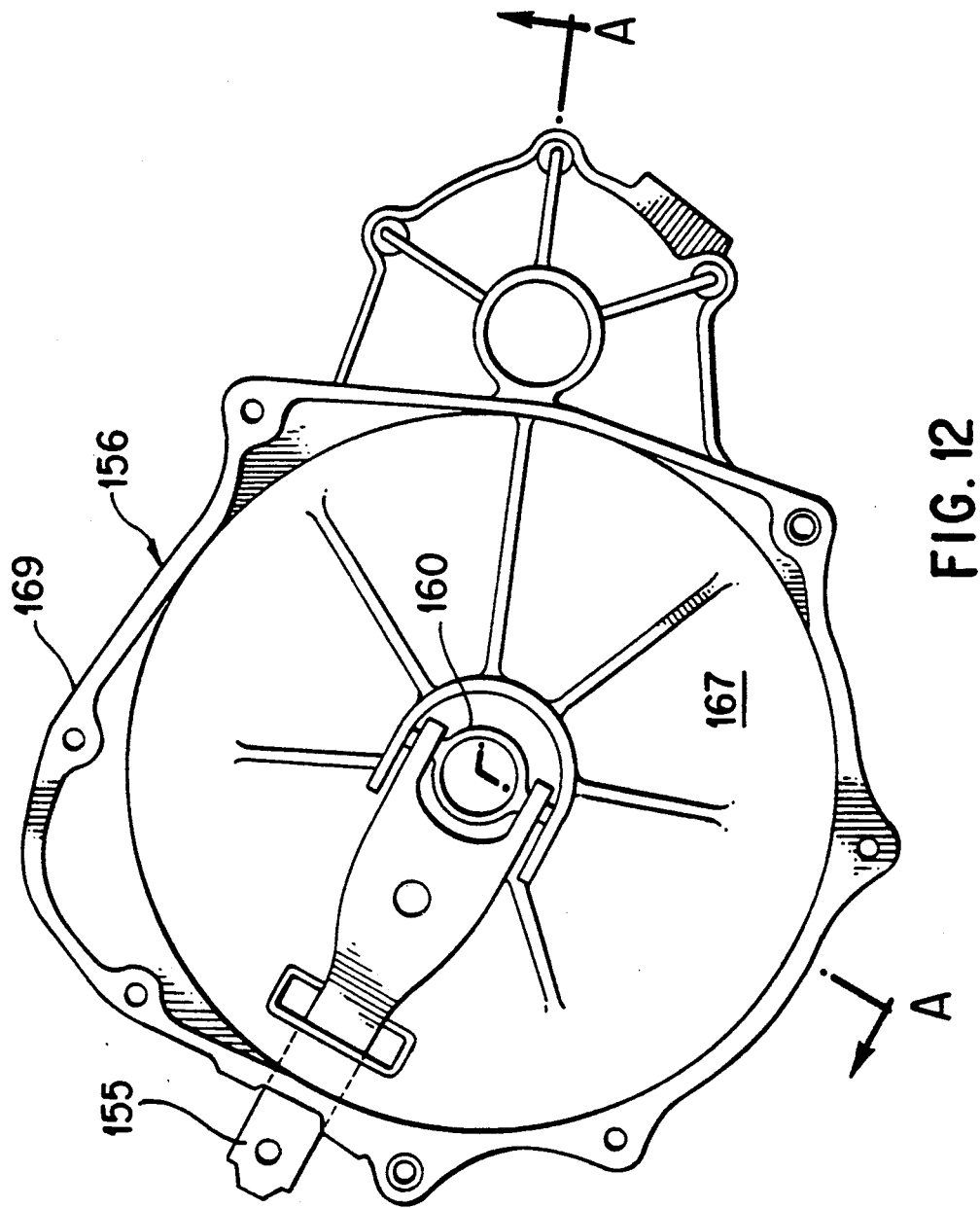
FIG. 12 is a front view of a clutch case.
Figure 14:
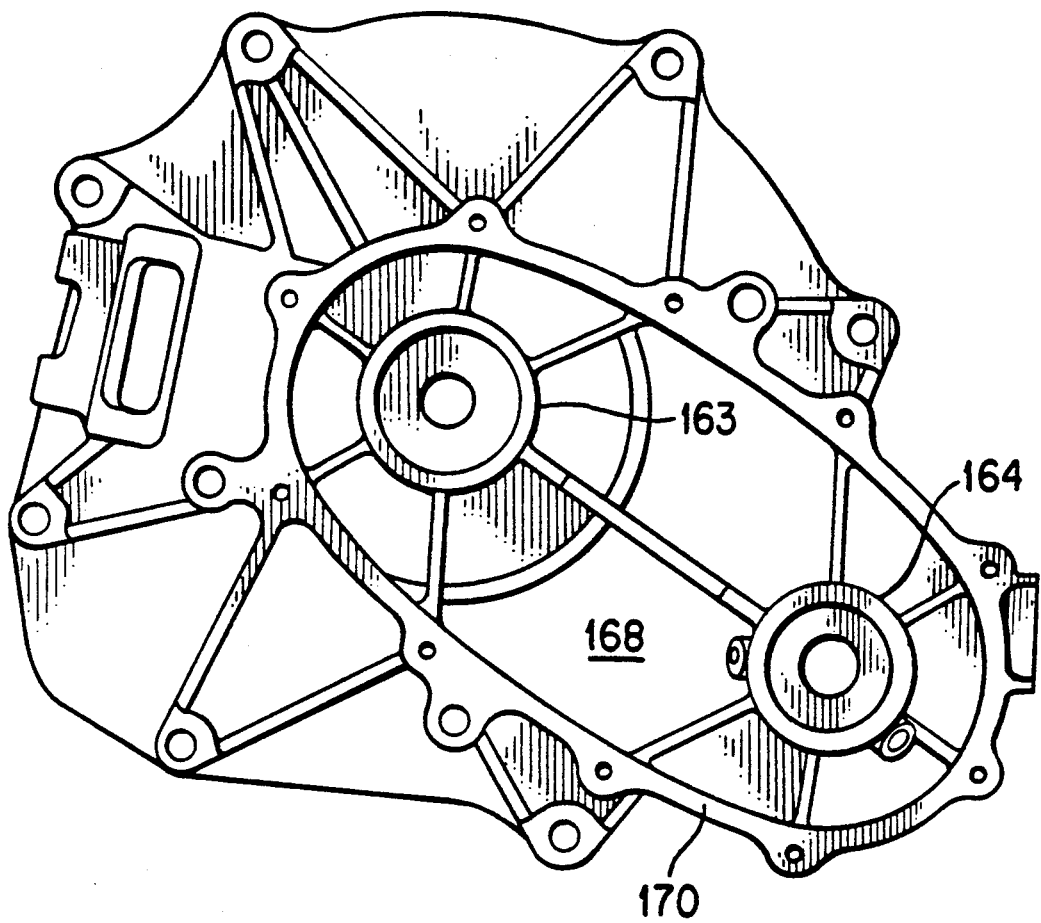
FIG. 14 is a rear view of the clutch case of FIG. 12.

As is shown in detail in FIGS. 12 to 14, the clutch case 156 is formed on one side, i.e., its inner side, with a clutch chamber 167 and on an other side, i.e., its outer side, with a sprocket chamber 168. Inside the clutch chamber 167, the clutch case 156 is integrally formed with the cylindrical sleeve 160 on which the release bearing 161 is mounted. On the other hand, inside the sprocket chamber 168, the clutch case 156 is integrally formed with the bearing mounting cylindrical bosses 163 and 164. The inner end of the clutch chamber 167 is shaped as an annular ring-shaped mating surface 169 fitted to the unitized case 140. The outer end of the sprocket chamber 168 is shaped as an elliptical ring-shaped mating surface 170, with poles at the centers of the bearing mounting cylindrical bosses 163 and 164, fitted to the sprocket-chain case 157.

Lubrication oil is recirculated through the transmission chamber 140T and the differential chamber 140D of the unitized case 140, and the sprocket chamber 168 through a single oil recirculation passage. These chambers 140T, 140D and 168 are structured so as to preserve lubrication oil therein at predetermined basic oil levels different from one another. Specifically, the differential chamber 140D has the lowest basic oil level, while the sprocket chamber 168 has the highest basic oil level. The basic oil level of the transmission chamber 140T is between those of the other two chambers 140D and 168. In the transmission chamber 140T, there is an oil pump 183 disposed adjacent to one end of the output shaft 122 of the transmission 103 so as to be driven by the output shaft 122. The oil pump 183 is connected to an oil strainer 182 disposed in the differential chamber 140D through an oil pipe 184. The oil pump 183 sucks oil in the bottom of the differential chamber 140D and feeds it into the sprocket chamber 168 through an axial oil passage 185 formed in the input and output shafts 121 and 122 of the transmission 103 so as to lubricate all elements of the transmission 103 and the sprocket-chain power transfer 112. The oil pipe 184, as is shown in FIG. 11, is disposed so as to turn around the front axle shaft 132R for the convenience of assembling the upper crank case 143 to the lower crank case 144.

Figure 9:
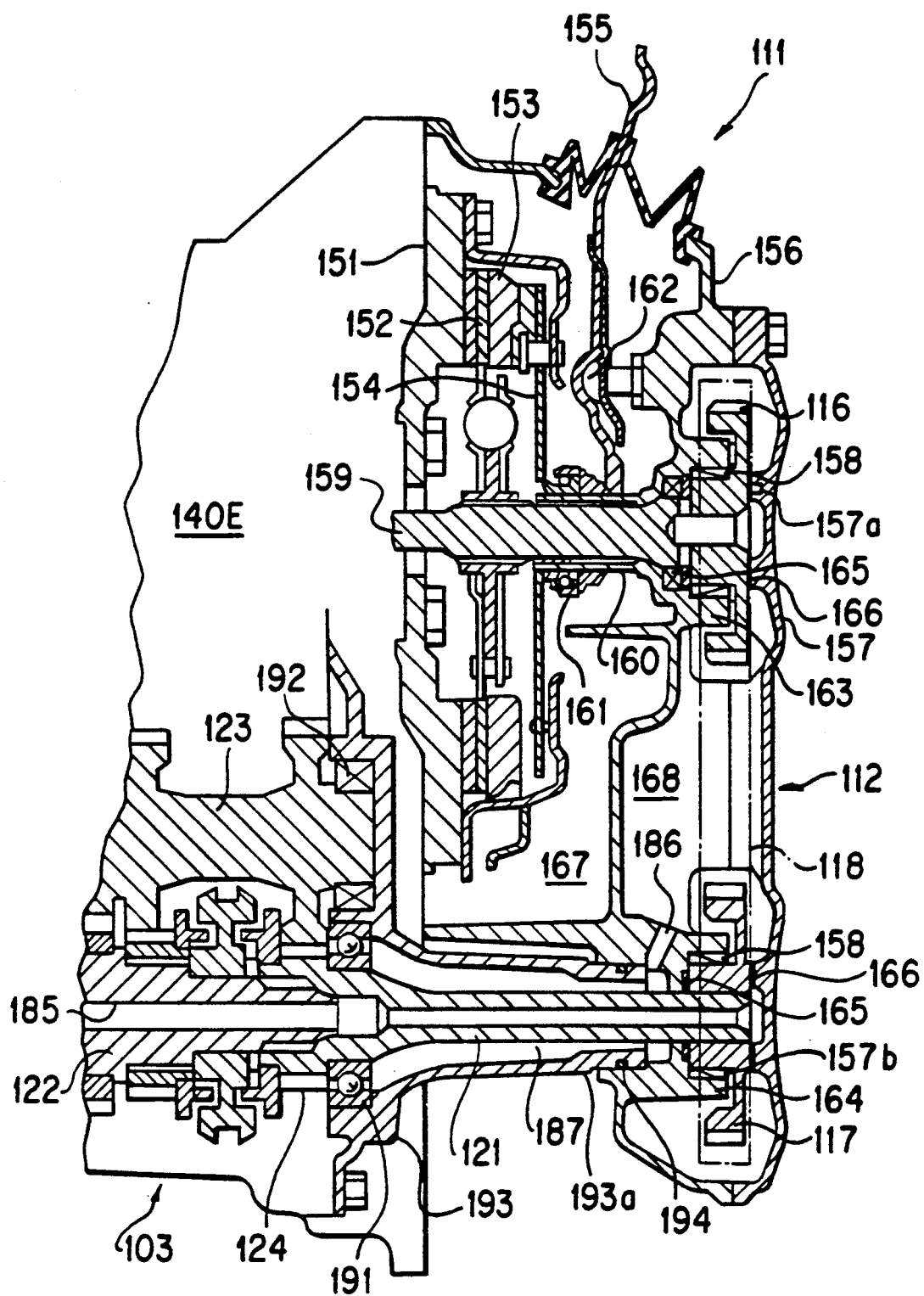
FIG. 9 is a cross-sectional view of an essential part of the powertrain of FIG. 8.
Figure 10:
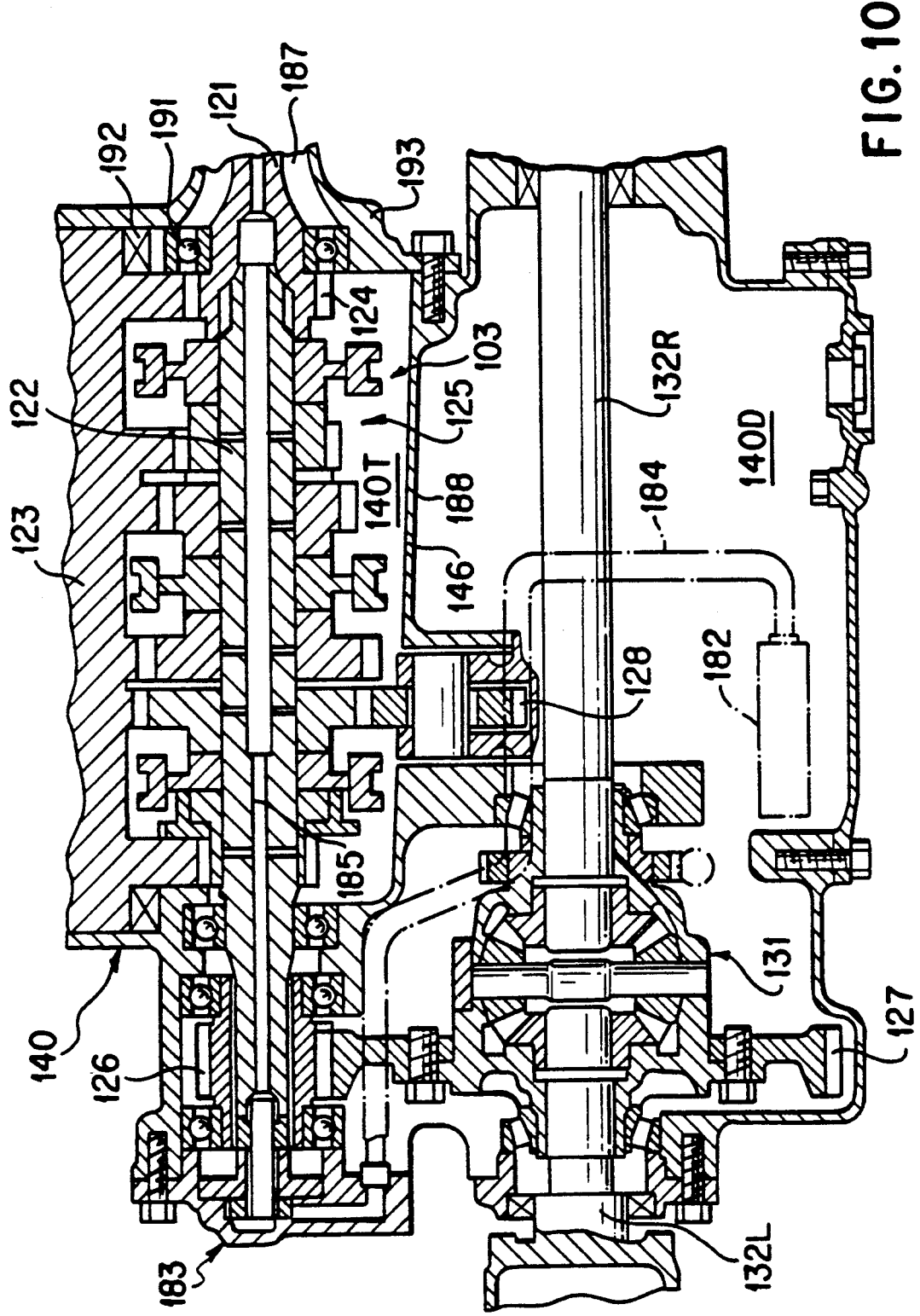
FIG. 10 is a cross-sectional view of an essential part of the powertrain of FIG. 8 showing an oil passage.

As is most clearly seen in FIG. 9, the clutch case 156, which forms one wall of the sprocket chamber 168, is provided with a drain passage 186 formed in the lower cylindrical bearing mounting bosses 164 for automatically draining oil from and returning oil to the sprocket chamber 168 and into the transmission chamber 140T through a return oil passage 187 formed around the input shaft 121 of the transmission 103. Such occurs when the volume of oil in the sprocket chamber 168 becomes higher than its basic oil level. The return oil passage 187 is formed by a cylindrical sleeve 193a, which extends coaxially with the input shaft 121 of the transmission 103 from a transmission side cap 193 into the sprocket chamber 168 and is fitted in the lower cylindrical bearing mounting bosses 164 so as to leave a cylindrical space around the input shaft 121. At the fitting portion, there is an oil seal ring 194 inserted between the cylindrical sleeve 193a and the lower cylindrical bearing mounting bosses 164. The transmission side cap 193, mounting a bearing 191 by which the input shaft 121 is held, is prepared separately from the unitized case 140 and is secured to the unitized case 140 after the shafts 121–123 of the transmission 103 are inserted into the unitized case 140. Further, as is most clearly seen in FIG. 10, a partition wall 146 between the transmission chamber 140T and the differential chamber 140D is formed with a drain hole 188 through which the oil in the transmission chamber 140T is automatically drained into the differential chamber 140D when the volume of oil in the transmission chamber 140T becomes higher than its basic oil level.

The engine 101 is provided with an intake manifold 196 attached to its front and an exhaust manifold 197 attached to its back and extending behind the powertrain 10 towards the back of the vehicle body 1.

While engine output is transmitted to the transmission 103, the oil pump 183 is driven by the output shaft 122 of the transmission 103 and sucks up oil within the differential chamber 140D, which has an oil level lower than oil levels of the other chambers, namely, the transmission chamber 140T and the sprocket chamber 168. The oil is sucked up through the strainer 182 and the oil pipe 184. Then, the oil pump 183 feeds the oil into the sprocket chamber 168, having an oil level higher than oil levels of the other chambers, namely, the differential chamber 140D and the transmission chamber 140T, through the axial oil passage 185 formed in t he input and output shafts 121 and 122 of the transmission 103. The oil in the sprocket chamber 168 is automatically drained into the transmission chamber 140T through the drain passage 186 and the return oil passage 187 when it exceeds the basic oil level. Similarly, the oil in the transmission chamber 140T is automatically drained into the differential chamber 140D through the drain hole 188 when it exceeds the basic oil level.

The single oil recirculation passage thus formed can independently maintain the basic oil levels of all the lubrication chambers, such as the transmission chamber 140T, the differential chamber 140D and the sprocket chamber 168, so that lubrication oil is suitably fed to mobile elements of the transmission 103, the front differential 130, and the sprocket-chain power transfer 112. Since the single oil recirculation passage is provided outside the clutch chamber 167, the clutch case 156 is shaped so that its size is small. Also, the clutch chamber 167 is kept fluid-tightly sealed. The thrust rings 165 and 166, provided between the clutch case 156 and both the sprockets 165 and 166, reinforce the supporting structure for the sprockets 165 and 166 and increase its structural strength. In combination with the bearings 158, the thrust rings allow the supporting structure to be made short in axial length.

Figure 15:
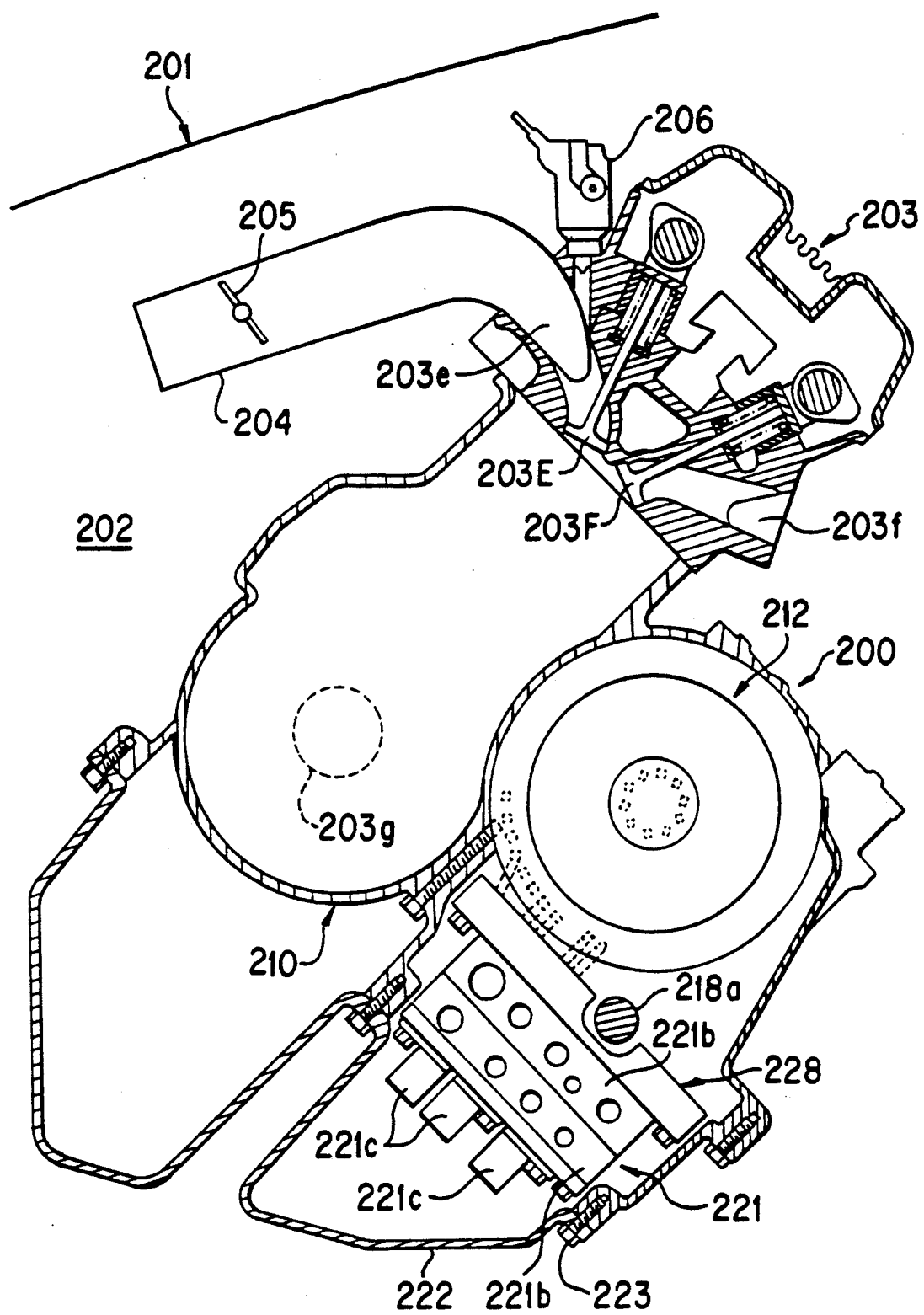
FIG. 15 is a cross sectional view showing the entire structure of a powertrain of an automotive vehicle in accordance with still another preferred embodiment of the present invention.
Figure 16:
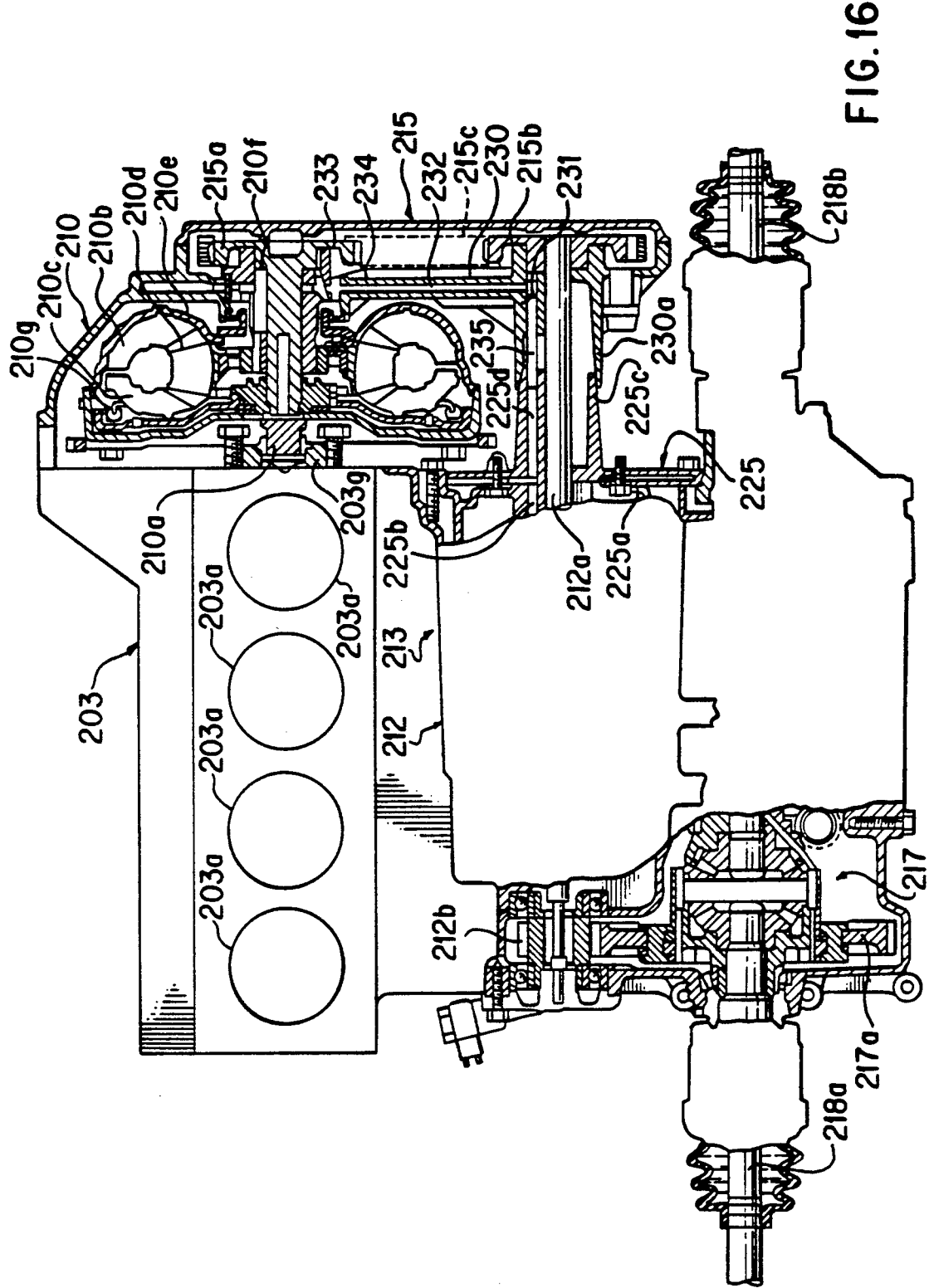
FIG. 16 is a cross-sectional view of an essential part of the powertrain of FIG. 15.

Referring to FIGS. 15 and 16, a powertrain 200 for a front engine-front drive vehicle constructed in accordance with another preferred embodiment of the present invention is shown. An engine 203, such as a four-cylinder reciprocating internal combustion engine, is disposed in an engine room or compartment 202 of a vehicle body 201 (partly shown) so as to be inclined at an appropriate angle toward the back of the vehicle and to direct its crankshaft 203g in a transverse direction of the vehicle body 201. The engine 203 has four cylinders 203a to 203d arranged in a straight row and parallel to the engine crankshaft 203g. The engine 203 also has a row of intake ports 203e, opening into the cylinders 203a–203d, respectively, and a row of exhaust ports 203f, opening into the cylinders 203a–203d, respectively. The intake ports 203e and the exhaust ports 203f are opened and shut at a predetermined valve timing by intake valves 203E and exhaust valves 203F, respectively. In each intake port 203e, there is provided a fuel injector 206. The engine 203 has an intake pipe 4 attached to it which is communicated with the intake ports 203e and in which there is provided a throttle valve 205.

An automatic transmission 212, such as a four-forward speed transmission, is equipped with a hydraulic torque converter 210 enclosed within a converter case 230. The automatic transmission 212 is closely arranged behind the transverse engine 203 so as to place the input shaft 212a of the transmission parallel to the engine crankshaft 203g. The torque converter 210, having an input shaft 210a directly fastened to the engine crankshaft 203g, includes a pump 210b fixedly fastened to the input shaft 210a, a turbine 210c facing the pump 210b and a stator 210d disposed between the pump 210b and the turbine 210c. The torque converter 210 is provided with a one-way clutch 210e for preventing the stator 210e from turning in an opposite direction with respect to the direction in which the turbine 210c turns. The torque converter 210 further has an output shaft 210f fixedly fastened to the turbine 210c and a lock-up clutch 210g for directly locking up the input and output shafts 210a and 210f. The hydraulic torque converter 210 is, on one hand, directly connected to an engine output shaft, such as the engine crankshaft 203g, and, on the other hand, operationally coupled to the automatic transmission 212 through a power transfer arrangement 215 interconnected between the output shaft 210f of the torque converter 210 and the input shaft 212a of the automatic transmission 212. The power transfer arrangement 215 includes a drive sprocket 215a, formed integrally with or otherwise secured to the output shaft 210f of the torque converter 210, a driven sprocket 215b, formed integrally with or otherwise secured to the input shaft 210f of the automatic transmission 212, and a chain 215c coupling the drive and driven sprockets 215a and 215b.

Right below the automatic transmission 212, there is disposed a front differential 217, from which right and left front axles 218a and 218b extend coaxially and in opposite transverse directions. The front differential 217, having a ring gear 217a which meshes with an output gear 212b of the automatic transmission 212, divides the output from the automatic transmission 212 into two parts for driving right and left wheels (not shown) through the right and left front axles 218a and 218b.

Automatic transmission 212 has a hydraulic control circuit, which itself forms a part of the automatic transmission 212, including a valve assembly body 221 disposed beneath the automatic transmission 212 and the front axles 218a and 218b. The control circuit hydraulically controls servo elements and shift elements. The valve body 221 has a plurality of valves divided into two, i.e., upper and lower, rows of valves a and b. A plurality of electric solenoids c are arranged in a row below the valve body 221. This valve body 221 is covered by a detachable cover 222 secured to the powertrain 200 with bolts 223. Between the valve body 221 and the transmission 212, there is a spacer block 228 with a plurality of oil passages (not shown) in communication with an oil passage system which will be described presently.

The oil passage system delivers oil into the transmission 212 and the torque converter 210 and includes a radial oil passage 225a and an axial oil passage 225b. The radial oil passage 225a is formed in a transmission case 225 so as to extend radially from the outside to the inside of the transmission case 225. The axial oil passage 225b extends along the input shaft 212a of the transmission 212 from the inner end of the radial oil passage 225a towards the middle of the transmission in the axial direction. Oil is initially introduced through the radial oil passage 225a from the valve body 221 and then into the axial oil passage 225b.

The transmission case 225 has a case extension, in the form of a cylindrical sleeve 225c which extends laterally toward the power transfer arrangement 215 in which the input shaft 212a of the transmission 212 extends so as to form a cylindrical space therebetween. The cylindrical space forms a part of an axial oil passage 225d. The converter case 230 is integrally provided with a cylindrical sleeve 230a, extending coaxially with the cylindrical sleeve 225c of the transmission case 225, in which the input shaft 212a of the transmission 212 extends so as to form a cylindrical space therebetween. This cylindrical space forms another part of the axial oil passage 225d. The converter case 230 has an oil passage 231 and an oil passage 232 in communication with the oil passage 231, both oil passages being formed in the cylindrical sleeve 230a. The oil passage 232 is communicated with the inside of the torque converter 210 through an oil passage 234 formed in a support 233 for the converter output shaft 210f and an oil passage 210h formed in the converter output shaft 210f itself. The oil passage 232 is also communicated with the bearing for drive sprocket 215a of the power transfer 215. Between the cylindrical sleeve 225c of the transmission case 225 and the cylindrical sleeve 230a of the converter case 230 there is disposed a connection pipe 235 which interconnects the axial oil passages 225d and 231.

Oil is fed into the torque converter 210 from the valve body 221 passing through the radial oil passage 225a of the transmission case 225, the axial oil passage 225d formed by the cylindrical sleeve 225c of the transmission case 225, the axial oil passage 231 formed by the cylindrical sleeve 230a of the converter case 230, and the oil passage 232 of the torque converter 232, in this order.

There may be a fitting error in the axial direction between the cylindrical sleeves 225c and 230a relative to the length of the input shaft 212a of the transmission 212. Such a fitting error can be caused due to allowable manufacturing errors of the transmission case 225 and the converter case 230. Even if such a fitting error is present, however, the connection pipe 235 disposed between the cylindrical sleeves 225c and 230a can absorb it, so that the axial oil passages 225d and 231 formed by the cylindrical sleeves 225c and 230a are firmly interconnected and thereby prevent oil leakage.

Figure 17:
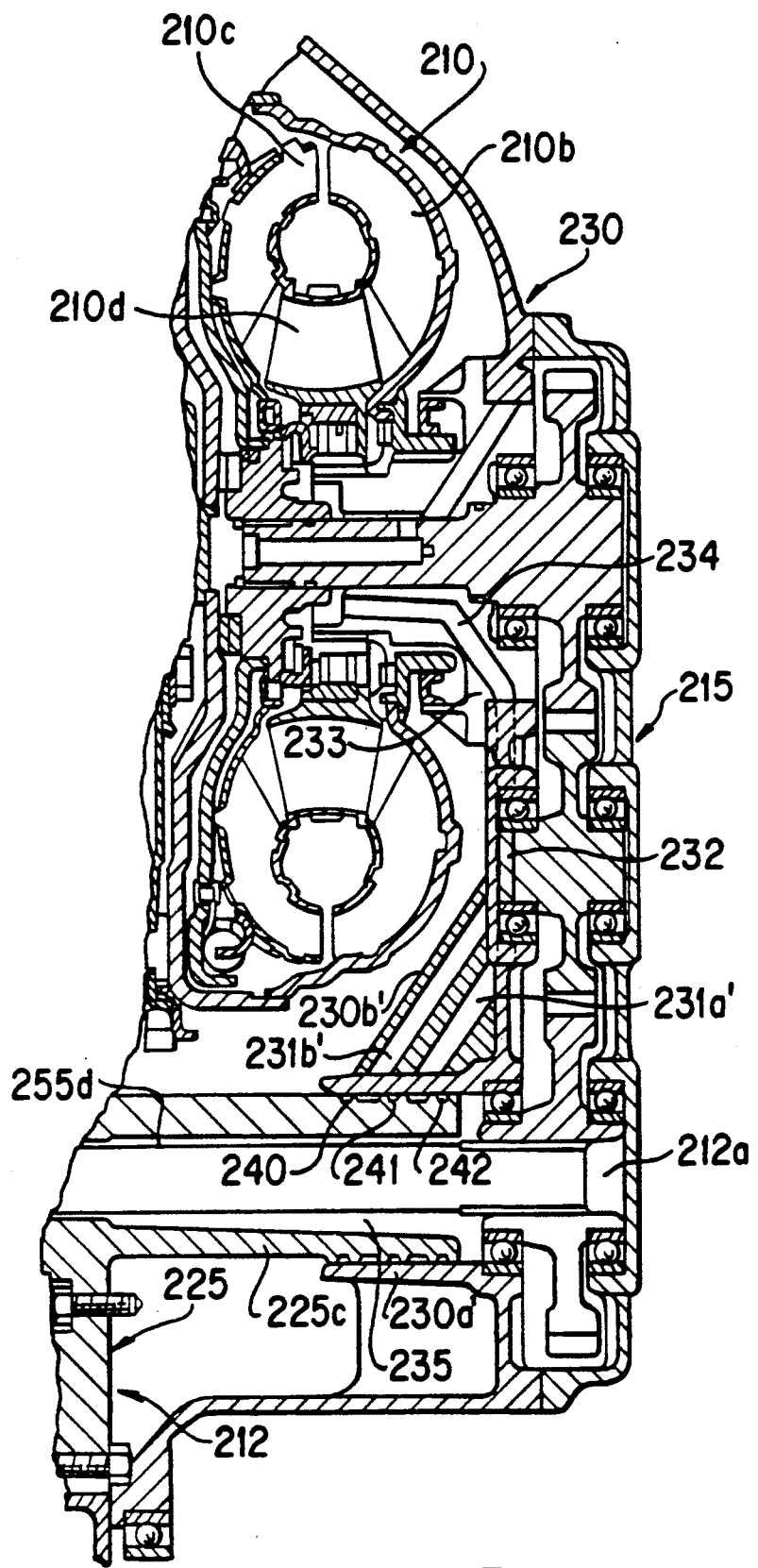
FIG. 17 is a cross-sectional view of a torque converter of the powertrain of FIG. 15 showing an oil passage.

Referring to FIG. 17, a variation of an oil passage system of a powertrain is shown. Except for oil passages provided between a torque converter and a transmission, the powertrain is the same in structure and operation as that of the previous embodiment. Consequently, the following description is particularly directed to the different oil passages. A transmission case 225 has a cylindrical sleeve 225c' by which an axial oil passage 225d is formed. The oil passage communicates the insides of the transmission case 225 and the converter case 230. The converter case 230 has a sleeve 230a' with a hub 230b'. The cylindrical sleeve 225c' is fitted into the sleeve 230a'. The hub 230b' of the converter case 230 is formed with an oil feed passage 231a', which is in communication with the axial oil passage 225d formed by the cylindrical sleeve 225c' of the transmission case 225, and an oil discharge passage 231b'. The oil feed passage 231a' is communicated with the inside of the torque converter case 230 through an oil passage 232 formed in the converter case 230 and an oil passage 234 formed in a support 233 for the converter output shaft 210f.

At the connection where the cylindrical sleeve 225c, of the transmission case 225 and the sleeve 230a' of the converter case 230 are fitted into each other, there are disposed oil seal rings 240, 241 and 242 which separate, in a fluid-tight manner, the oil feed passage 231a' and the oil discharge passage 231b' from each other.

The oil seal rings provided between the sleeves 225c' and 230a' of the transmission case 225 and the torque converter case 230 provide the same result as the connection pipe 235 of the previous embodiment.

It is to be understood that although the present invention has been described with respect to a preferred embodiment thereof, various other embodiments and variants which fall within the scope and spirit of the invention are possible. Such other embodiments and variants are intended to be covered by the following claims.

What is claimed is:

1. A structure of a powertrain disposed in an engine compartment of an automotive vehicle, comprising:
   an engine placed within the engine compartment, said engine having a crankshaft directed in a transverse direction of a vehicle body;
   a transmission placed within the engine compartment, said transmission having an input shaft and an output shaft which are arranged coaxially with each other and directed parallel to said crankshaft;
   an engine clutch disposed adjacent to said engine, said engine clutch being directly connected to said crankshaft;
   power transfer means, disposed oppositely to said engine with respect to said engine clutch, for operationally transferring power from said engine clutch to said input shaft of said transmission so as to transmit an output from said engine to said transmission,
   casing means, having a plurality of separate oil sealed chambers, for independently housing each of said transmission, said engine clutch and said power transfer means in a separate one of said chambers, and
   sleeve means, attached at one end to said transmission and at its other end to said power transfer means, for surrounding said input shaft, said sleeve means passing through the chamber independently housing said engine clutch, being supported at said other end by said casing, and being radially spaced from said input shaft to define an oil passage communicating on one end with the chamber in which said transmission is housed and on its other end with the chamber in which said power transfer means is housed for allowing oil to flow between the chamber in which the transmission is housed and the chamber in which the power transfer means is housed.

2. A structure of a powertrain as recited in claim 1, wherein said casing means comprises a main case, formed with at least said chamber housing said transmission, which is formed with an opening through which said transmission is assembled, a clutch case, secured to said main case so as to form said chamber housing said engine clutch, a power transfer case secured to said clutch case so as to form said chamber housing said power transfer means, and a support cap attached to said power transfer means for supporting said input shaft for rotation, said support cap being formed with the sleeve means comprising a cylindrical hollow sleeve extending coaxially with said input shaft between said main case and said clutch case so as to communicate said chamber housing said transmission with said chamber housing said power transfer means, thereby forming said oil passage.

3. A structure of a powertrain as recited in claim 2, wherein said sleeve means further comprises a cylindrical hollow sleeve formed as part of the clutch case extending coaxially with said input shaft and fluid-tightly connected to said cylindrical hollow sleeve of said support cap, the two hollow sleeves together defining said oil passage.

4. A structure of a powertrain as recited in claim 2, wherein said support cap is formed with a mount for a bearing for holding said input shaft.

5. A structure of a powertrain as recited in claim 2, wherein said main case is further formed with a chamber for housings therein said engine independently from said transmission.

6. A structure of a powertrain as recited in claim 1, wherein said oil passage is provided outside the chamber housings said engine clutch.

7. A structure of a powertrain as recited in claim 2, wherein said input shaft and said output shaft of said transmission are formed with axial oil passages, extending therein along their entire lengths, through which oil is fed into and out of said chamber housing said transmission and into said chamber housing said power transfer means.

8. A structure of a powertrain as recited in claim 7, and further comprising an oil pump attached to and driven by said output shaft so as to force oil into said chamber housing said power transfer means through said axial oil passages, said oil, when its volume increases above a predetermined level in said chamber housing said power transfer means, being returned into said chamber housings said transmission through said passage through which said input shaft extends.

9. A structure of a powertrain as recited in claim 1, wherein said power transfer means comprises a drive sprocket fastened to said engine clutch, a driven sprocket fastened to said input shaft, and a chain transfer for said drive sprocket and said driven sprocket.

10. A structure of a powertrain as recited in claim 9, and further comprising a thrust member, disposed between said power transmission case and each sprocket, through which each sprocket is axially pressed and supported.

* * * * *